(12) United States Patent
Vogler et al.

(10) Patent No.: US 8,466,944 B2
(45) Date of Patent: Jun. 18, 2013

(54) DEVICE AND PROCESS FOR MARKING A MOVING OBJECT BY LASER

(75) Inventors: Sven Alexander Vogler, Manresa (ES); Francisco Bravo Montero, Manresa (ES)

(73) Assignee: Macsa ID, S.A. (ES)

( * ) Notice: Subject to any disclaimer, the term of this patent is extended or adjusted under 35 U.S.C. 154(b) by 49 days.

(21) Appl. No.: 13/086,924

(22) Filed: Apr. 14, 2011

(65) Prior Publication Data
US 2011/0261140 A1    Oct. 27, 2011

(30) Foreign Application Priority Data
Apr. 21, 2010 (ES) .................................. 201030579

(51) Int. Cl.
*B41J 2/435* (2006.01)
*B41J 2/47* (2006.01)

(52) U.S. Cl.
USPC .......................................... 347/224; 347/225

(58) Field of Classification Search
USPC ................. 347/224, 225; 219/121.6, 121.61, 219/121.78, 121.79, 121.8
See application file for complete search history.

(56) References Cited

U.S. PATENT DOCUMENTS

| | | | |
|---|---|---|---|
| 4,564,737 A * | 1/1986 | Burke et al. | 219/121.68 |
| 4,878,127 A | 10/1989 | Zollman et al. | |
| 5,653,900 A | 8/1997 | Clement et al. | |
| 5,961,860 A | 10/1999 | Lu et al. | |
| 6,061,081 A * | 5/2000 | Hasebe et al. | 347/247 |
| 6,734,392 B2 | 5/2004 | Philipp et al. | |
| 7,355,614 B2 * | 4/2008 | Franklin | 347/225 |
| 2005/0133565 A1 | 6/2005 | Lee | |
| 2005/0177330 A1 * | 8/2005 | Huang | 702/85 |

FOREIGN PATENT DOCUMENTS

| | | |
|---|---|---|
| EP | 0 320 137 A1 | 6/1989 |
| EP | 1 228 833 A2 | 8/2002 |

OTHER PUBLICATIONS

European Search Report issued in Appln No. 11382108.6-2302 / 2380693 Mar. 21, 2012.

* cited by examiner

*Primary Examiner* — Hai C Pham
(74) *Attorney, Agent, or Firm* — RatnerPrestia

(57) ABSTRACT

Device and process for marking a moving object by laser
A process for marking a moving object by means of a laser using a laser system with a laser beam with the ability to mark within a working area characterised in that:
   the position of the object to be marked is obtained by means of a sensor, and
   the speed of the object to be marked is varied in relation to the position of the object to be marked relative to the working area and/or the position of the laser beam within the working area.

26 Claims, 4 Drawing Sheets

DEVICE AND PROCESS FOR MARKING A MOVING OBJECT BY LASER

This invention refers to a device for marking a moving object (whether the movement is translational or rotational) by laser, and to the process carried out by the device.

Dynamic marking of moving objects (e.g. an object located on a conveyor belt in an industrial process or an object which rotates on itself) with a laser is a known technique.

According to the state of the art a laser marking system is provided in the vicinity of a production line (e.g. a conveyor belt) or close to a rotating carousel on which the object to be printed is placed. A 2D laser marking system of the conventional type can be used to print a set of vector or rasterised data on a planar square area. The square area which can be printed upon is known as the "working area" of the writing lens of the laser.

The speed of movement of the moving object with respect to the stationary working area is determined by the speed of the production line. The speed of the production line is commonly controlled by an electric motor.

According to what is currently known, the speed is fixed by the needs of the production line, but not the laser system, which having a stationary working area must according to the known art adapt to the speed provided by the production line. Thus when the object enters within the working area the system begins to mark the product. If the marking system comprises a position encoder to obtain the position of the object which has to be marked in real time, it may be possible that the production line may not necessarily have a constant speed during the marking process, and may vary in the course of the process. In order to permit this variability in the speed it is necessary to have computer hardware and/or software (dedicated printed circuit, PLC, or any other technical means available) to correct or convert the two-dimensional vector or rasterised data corresponding to the mark which has to be made by the laser in real time and consequent move the laser beam over the surface of the object.

Document U.S. Pat. No. 6,734,392 discloses a marking production line of the linear type in which a velocity sensor whose output is connected to the control electronics of the marking laser system in order to change the operating parameters of the marking laser.

Document U.S. Pat. No. 5,653,900 discloses a system for marking cylindrical objects in which the movements of the laser are a function of the speed of the object to be marked. A similar situation arises in document U.S. Pat. No. 4,564,737A, in which the speed of rotation of the part to be marked is constant.

Document EP 0 320 137 A discloses a device for etching rotary printing screens in which the laser system moves along the axis of the screen and a movable support is provided so that the part which has to be etched is maintained in a constant position with respect to the laser head.

Nevertheless this known technique is not without problems. If the production line exceeds a particular speed ("critical speed") the object is not marked in its entirety because it leaves the working area before all the vector or parameterised data can be marked. If this occurs an operator has to reduce the speed manually so that products are suitably marked. The most modern marking systems can provide feedback for an excessive speed condition. This means they can provide an electrical signal to indicate that the product cannot be marked because the speed is greater than the critical speed. In this case the line stops and an operator has to remove unmarked products from the line and restart the line at a slower speed.

The object of this invention is to provide a solution to the problems stated above.

More particularly, this invention comprises a process for marking a moving object by laser by means of a laser system with a laser beam with the ability to mark in a working area in which:
  the position of the object which is to be marked is obtained (typically by means of a sensor), and
  the speed of the object to be marked is varied in relation to the position of the object to be marked relative to the working area and/or the position of the laser beam within the working area.

This invention therefore discloses the control of the speed of a production line (whether this is a system for translational movement of the object to be marked, or a rotational system which causes the object to be marked to rotate upon itself) which is based on marking parameters. The parameter selected by the invention is the position of the object to be marked.

In a preferred embodiment, when the area to be marked of the object to be marked lies within the working area of the laser, that is during the marking process, control based on position of the object to be marked can advantageously be replaced by control of the speed based on the position of the laser beam within the working area. In this respect it should be borne in mind that the position of the laser beam depends on the movement of the part to be marked and the segments into which the pattern being marked (vector and/or rasterised data) is divided, but more particularly the sequencing of the segments into which the mark which has to be made is divided.

Preferably, if the sensor detects the object to be marked in a position such that the next point which has to be marked on the part is located outside the working area of the laser system, the speed-varying signal causes the drive system to increase the speed of the object to be marked.

Again preferably, if the sensor acquires a position of the object to be marked such that the next point which has to be marked on the part is located in a first sub-area of the working area comprising the area of the working area closest to the area on the part to be marked in relation to the movement of the part to be marked, the speed-varying signal causes the drive system to increase the speed of the object to be marked.

More preferably, when the sensor detects the object to be marked in a position such that the next point which has to be marked on the part is located in a second sub-area of the working area adjacent to the first sub-area, the drive system maintains (or adjusts) the speed of the object to be marked.

Even more preferably, when the sensor detects the object to be marked in a position such that the next point which has to be marked on the part is located in the third sub-area of the working area, the varying signal causes the drive system to reduce the speed of the object to be marked.

Likewise preferably, when the sensor detects the object to be marked in a position such that the next point which has to be marked on the part is located in a final working sub-area comprising the area within the working area which is furthest from the area on the part which has to be marked in relation to the movement of the part to be marked, the speed-varying signal causes the drive system to adopt the minimum controlled speed.

This invention can be applied to all kinds of production lines controlled by any type of electric motor, also including rotatory lines, in which the object does not move in a linear fashion on a belt but rotates on a carousel or is caused to rotate about its own axis (for example the marking of rings in jewellery, the marking of bearings).

According to another aspect of this invention, a marking system which is suitable for performing the process to which this invention refers is disclosed.

In particular, this invention also comprises a system for marking a moving object by laser which comprises:
- a laser system with a laser beam with the ability to mark within a working area, with a controller,
- a drive system with the ability to move the object to be marked, and
- a sensor system to obtain the position of the object to be marked in which
- the laser system and the sensor system are connected in such a way that the controller of the laser system has one signal input corresponding to a position signal from the sensor system, and
- the laser system and the drive system are connected in such a way that the speed controller of the drive system receives a speed-varying signal from the controller of the laser system which is a function of the position signal received by the laser system in relation to the working area and/or the position of the laser beam within the working area.

Preferably, the speed controller of the drive system is a servocontroller.

In a novel way the laser system to which this invention refers provides real time control of the speed of the production line, for example through a servomechanism. Thus, the speed of the production line can be optimised according to the information which has to be marked on the object to be marked.

Again preferably, the signal received by the servocontroller is the servocontroller control signal.

Likewise preferably the laser system is a two-dimensional or three-dimensional marking system with the ability to move the laser beam within the working area.

In particularly preferred embodiments the components of the system to which this invention refers are related together in such a way as to control the speed of the object to be marked in relation to its position according to the preferred embodiments of the abovementioned process.

For a better understanding, drawings of an embodiment of the device and the process for marking a moving object by a laser beam to which this invention refers are appended by way of an explanatory but non limiting example.

FIG. 1 shows diagrammatically a first embodiment of the system to which this invention refers. In the figure there will be seen a laser marking system -1- which emits a laser beam -2- to mark a pattern on the area which has to be marked -31- of an object to be marked -3-.

The object to be marked -3- is rotated about its own axis by a motor -70-. The speed of the motor is controlled by a servomotor -5-. Connections (in this case cable electrical connections, although they may be of another type) between motor -70-, laser system -1- and servomotor -5- are shown. The connection cable between motor -70- and the laser system is shown by the number -21- and is used to transmit the position of the part to be marked to the controller of the laser system (in this case the sensor to obtain the position of the part may be a sensor for the position of the drive shaft within the motor, although it may be of another type). Connection cable -52- between servo -5- and motor -70- is used to send instructions for increasing or decreasing speed to motor -70-. Connection cable -15- between laser system -1- and servo -5- transmits the control signal from the controller of the laser system -1- to servo -5-.

Figure 1:
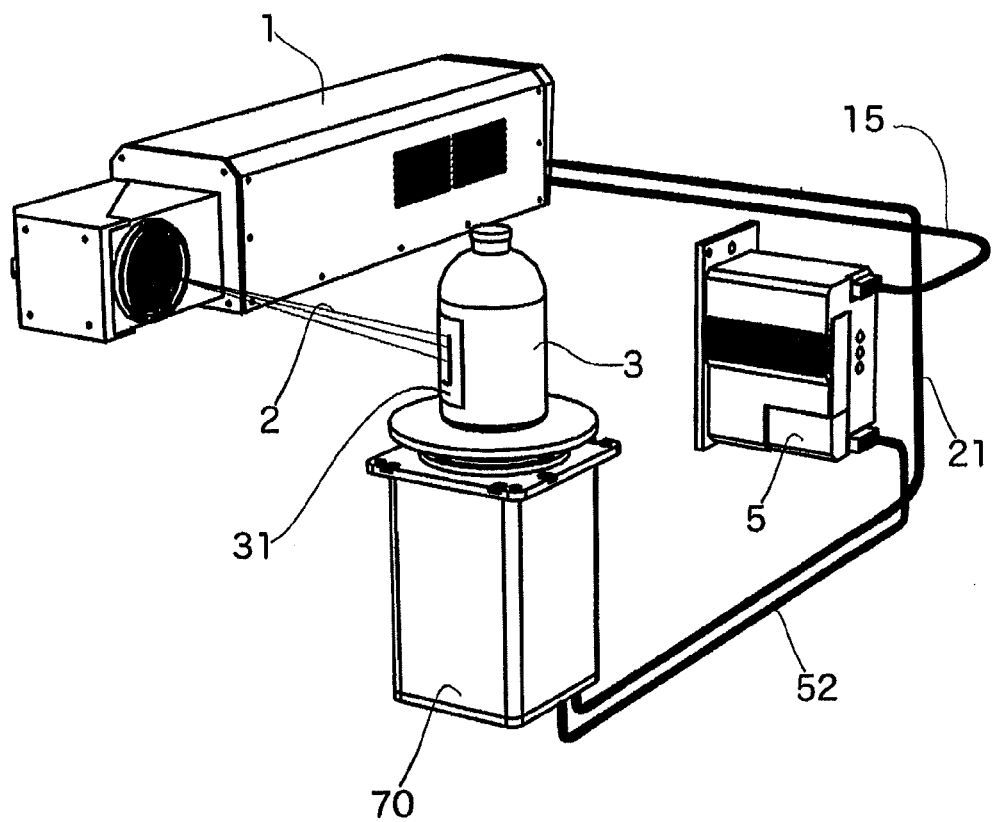
FIG. 1 shows diagrammatically an embodiment of a system according to this invention.
Figure 2:
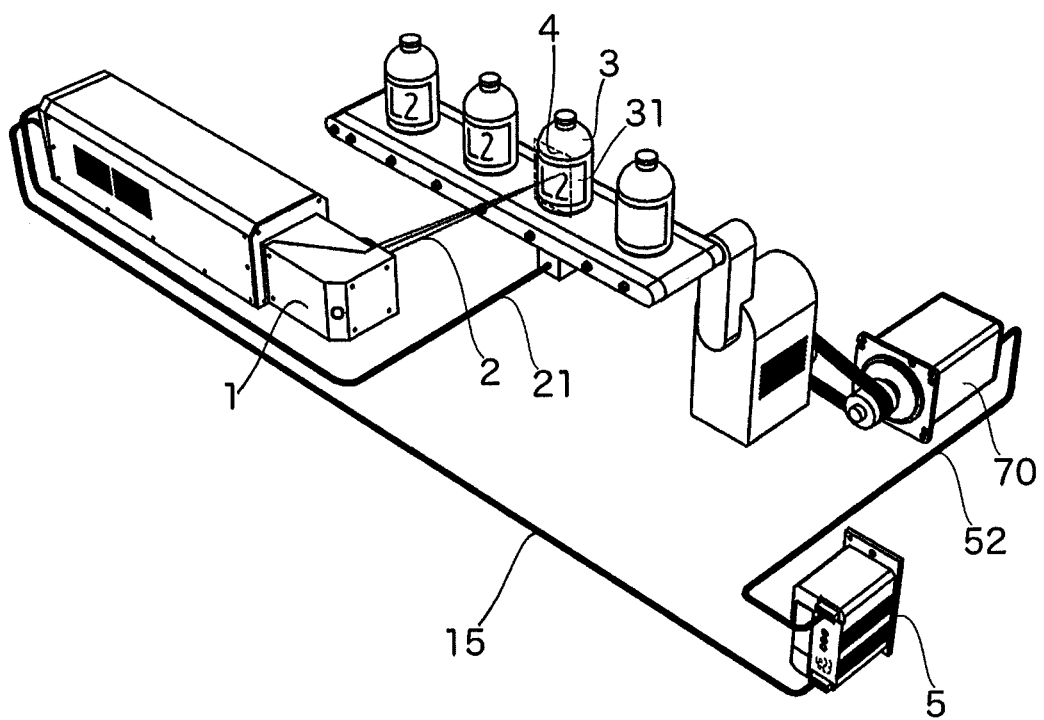
FIG. 2 shows diagrammatically a second embodiment of another system according to this invention.

FIG. 2 shows another embodiment of a system according to this invention. Given the similarities between the two embodiments identical or equivalent components have been identified by the same numbers, so they will not be explained in detail. Unlike the embodiment in FIG. 1, which considered a rotating production line, the production line in FIG. 2 is linear (conveyor belt). In this case the connection cable -21- which provides information about the position of the part to be marked -3- to the laser system, starts from the conveyor belt and not from the motor -70-. In addition to this, the working area -4- of the laser system -1- which delimits the points which can be marked by the laser beam, which can move within the limits, is represented by a square dotted line.

Figure 3:
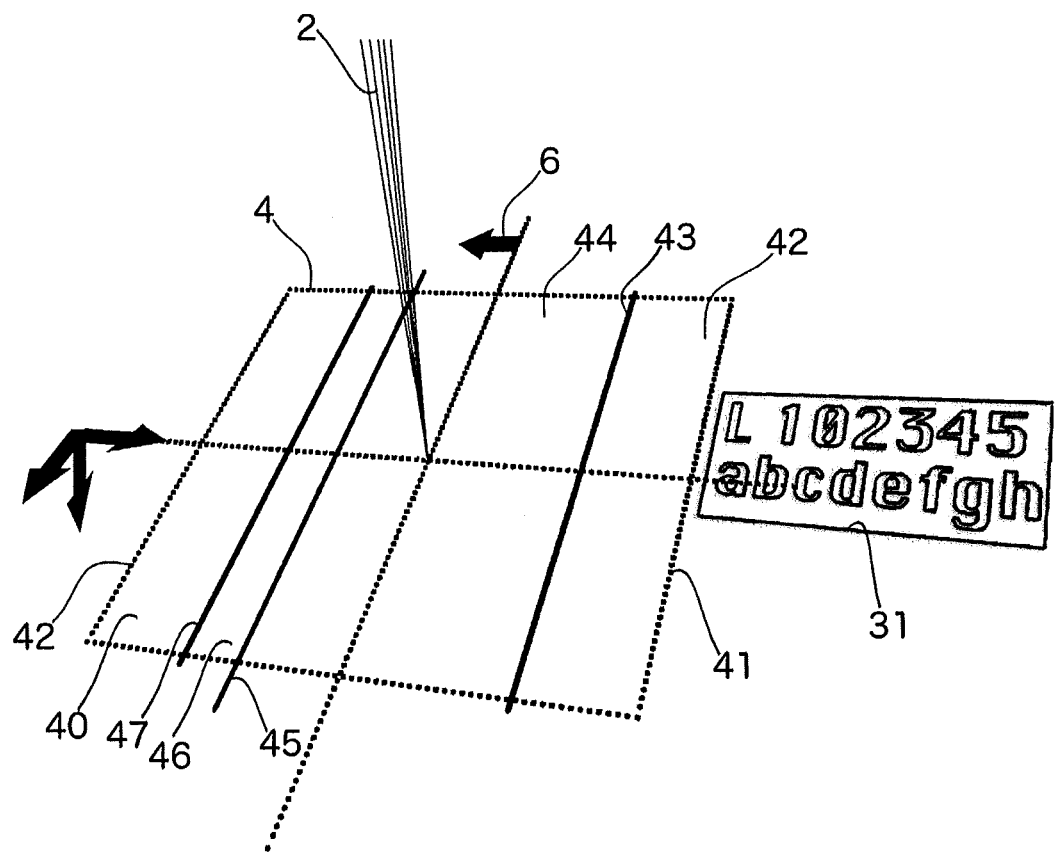
FIG. 3 is a detail diagram in which a marking process according to this invention may be seen.

FIG. 3 shows diagrammatically a marking process according to a preferred embodiment of this invention.

The product to be marked has been shown through the area of the same which has to be marked -31-, in which the message or vector data which has to be marked have been illustrated purely for illustrative purposes. In the example in the figure the vector data are consistent with a two line text "L0123..", although they may be of any type.

The working area -4- of the laser system has been shown by a square dotted line.

The laser system can move the laser beam -2- to any point within the working area by means of, for example, two galvanometric scanners (not shown) and control electronics. In this example the object to be marked moves from right to left, as shown by arrow -6-. The control electronics of laser system -1- receive the position of the object to be marked by means of a sensor connected thereto (e.g. a position or other encoder type).

Position detection or an electronic trigger signal initiates the marking process and defines a reference point for measuring the position.

The data which have to be marked can be reduced to a set of multiline segments making up the vector data for the mark, and in this case the vector data are ordered from left to right. The multiline segments are stored in a memory of the marking system control electronics in such a way as to ensure that the controller has access to the multilinear data segments in real time (i.e. in less than 1 microsecond).

The multilinear segment data represent the objective position of laser beam -2- in the x-y plane of working area -4-. Coordinate x has to be corrected continually on the basis of an offset which is calculated using the information provided by the position sensor signal.

In the example shown the working area is divided into four sub-areas.

The first sub-area -42- starts at the extreme right-hand end of the working area (where the area marked -31- enters working area -4-) as far as a line which we will call the "right-hand limit"-43-. As will be seen in the figure, the first sub-area corresponds to the area of working area -4- closest to the marked area -31- on the product or object to be marked.

A second sub-area -44- extends from right-hand limit -43- to control limit -45-. The second and third areas are therefore adjacent.

A third area -46- extends from control limit -45- to a line known as the "left-hand limit"-47-. The third -46- and second -44- sub-areas are therefore adjacent.

A fourth or final sub-area -40- extends from the left-hand limit -47- to the lefthandmost extremity -42- of working area -4-. Thus the last sub-area corresponds to the furthest area from the marked area -31- of the object to be marked. In this case in particular third sub-area -46- and the final sub-area -40- are adjacent. Nevertheless it is possible to divide the working area into a larger or smaller number of sub-areas.

A multilinear segment can be marked as soon as the location of the area to be marked -31- of the object to be marked -3- enters within working area -4-. Thus the segments are preferably ordered from left to right to optimise the marking process.

Figure 4:
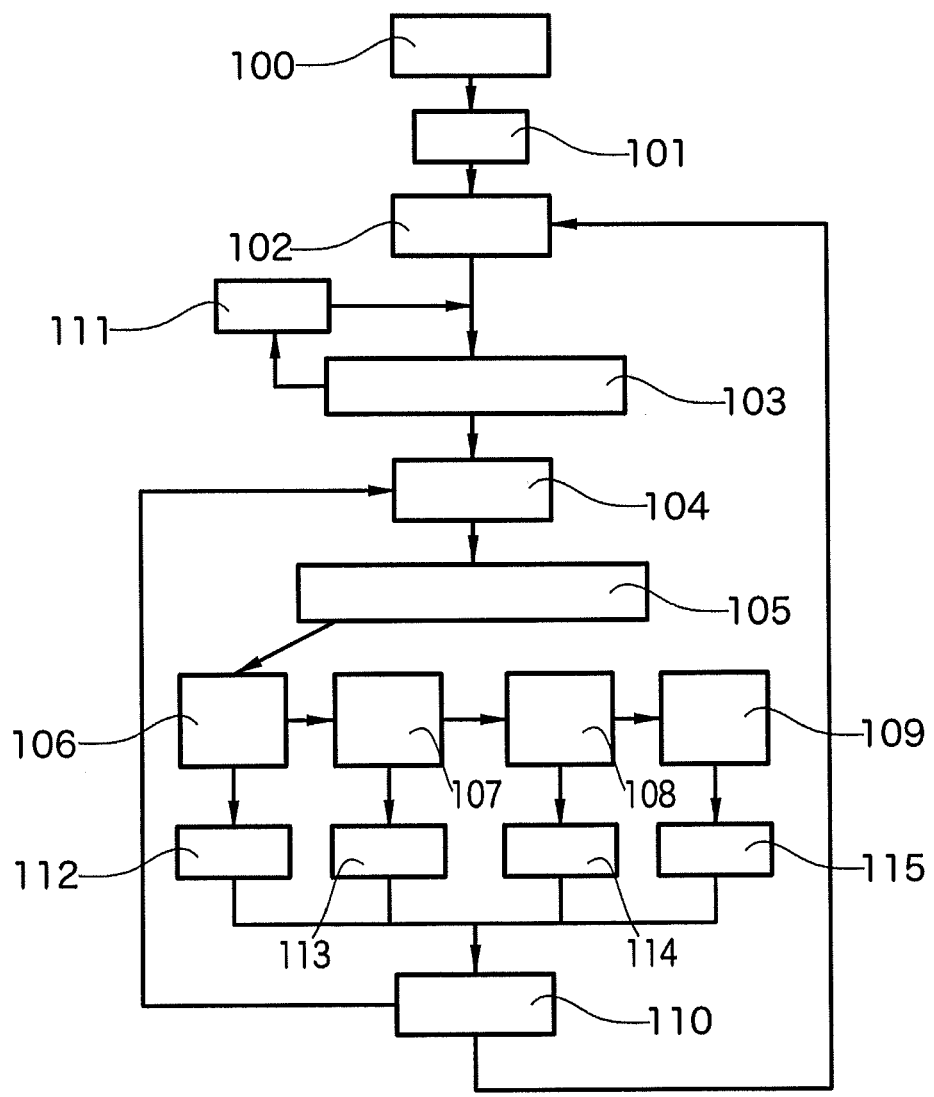
FIG. 4 is a block diagram providing an example of a possible embodiment of a process according to this invention.

With reference to FIG. 4, the laser system waits until the next polygonal segment which has to be marked enters within working area -4-. As soon as the segment enters working area -4- the laser beam -2- aims at the target positions in the segment, continuously performing the correction necessary due to movement of the object to be marked. As a segment is marked this can be deleted from memory and the next segment can be marked in the same way.

The marking system provides a feedback signal to control the speed of the production line. This feedback signal may be in the form of an analog or digital signal of sufficient resolution and represents a speed command for the production line. An external servocontroller -5- which controls the speed of the line may be used for this purpose. The feedback signal provided by marking system -1- acts as a control signal for servocontroller -5- and is preferably proportional to the desired speed of the production line.

The control electronics (laser system controller) has at all times information about the target position of the multilinear segment which has to be marked. By means of the position information provided by the sensor (encoder) it corrects the target position of laser beam -2- and calculates the coordinates (x, y) of the laser beam at any time.

The feedback signal for servocontroller -5- is directly related to the speed of the production line. The control electronics define a maximum feedback signal (Vmax) and a minimum feedback signal (Vmin). Both can be configured in relation to the permissible maximum and minimum line speeds. An implementation time for the feedback signal (tu) is defined. After a time interval tu has elapsed the control electronics calculate and apply a new value of the feedback signal.

A possible operating algorithm may be seen in FIG. 4.

At the start -100- the control electronics establish an initial feedback signal -101-, and the segment being marked -102- is loaded. The following operations are performed in each interval tu. It is established -103- whether the target position of the segment to be marked lies within working area -4-. If not, a command -111- to increase the feedback signal is provided (typically a doubling of its value). If at least one target position lies within the working area the segment is printed -104-.

The position of laser beam -2- is checked in -105- during every tu while marking is in progress. If the actual position (x, y) of the laser beam during the marking process (with the due correction for movement of the production line) lies within -106- the first sub-area -41-, the control electronics increase the feedback signal -112-, for example by a factor of two, with the limit of reaching the maximum predetermined value (Vmax) of the feedback signal. Servocontroller -5- receives the feedback signal as a control signal and consequently sets the speed of the production line. As the speed of the production line increases the position (x, y) of laser beam -2- moves to the left to second sub-area -44-.

If the position (x, y) of laser beam -2- (under the same conditions as mentioned before) falls in -107- within the second sub-area -44-, the supply signal is neither increased nor decreased in -113-. The production line speed is therefore maintained constant by the servocontroller. Depending upon the marking speed of the marking system the position (x, y) of laser beam -2- remains in second sub-area -44-, returns to first sub-area -42- or advances to third sub-area -46-.

If the position (x, y) of laser beam -2- (again under the same conditions) falls within third sub-area -46-, the feedback signal is reduced in -114- by a factor, for example it is reduced by half. As a consequence servocontroller -5- reduces the speed of the production line.

If the position (x, y) of the laser beam (under the same conditions) falls in -109- within the last sub-area -40- the feedback signal adopts -115- its minimum value and servocontroller -5- reduces the speed of the production line to a minimum value.

Once the printing or marking of a segment has been completed in -110-, the next is taken in -102- and the process is repeated.

The sizes of the different sub-areas must be determined with care having regard to the acceleration/deceleration times for the production line. Typical action times for the feedback signal are between 1 ms and 20 ms. Servocontroller -5- must preferably be capable of applying a filter to the feedback signal to prevent unnecessary high frequency accelerations/decelerations of the production line.

It is not necessary for the control electronics of the laser system to apply a filter to the feedback signal.

Although the invention has been described in relation to examples of preferred embodiments, these must not be regarded as restricting the invention, which will be defined by the broadest interpretation of the following claims.

The invention claimed is:

1. A process for marking a moving object by laser comprising:
   configuring a laser system with a laser beam to mark an object within a working area;
   obtaining the position of the object to be marked by a sensor, and
   varying the speed of the object to be marked relative to the working area and the position of the laser beam within the working area.

2. A process according to claim 1, wherein the object to be marked moves along a line.

3. A process according to claim 1, wherein the object to be marked rotates about itself.

4. A process according to claim 1, wherein the laser system is a two-dimensional marking system with the ability to move the laser beam within the working area.

5. A process according to claim 1, wherein the laser system is a three-dimensional marking system and the laser beam is moveable within the working area.

6. A process according to claim 1, wherein the mark made is subdivided into segments marked on the object sequentially.

7. A process according to claim 1, wherein if the sensor obtains a position of the object to be marked such that the next point to be marked on the object is located outside the working area of the laser system, a speed-varying signal causes a drive system to increase the speed of the object to be marked.

8. A process according to claim 1, wherein if the sensor obtains a position of the object to be marked such that the next point which has to be marked on the object is located in a first sub-area of the working area which comprises the area of the working area closest to the marking area for the object in relation to the movement of the object to be marked, a speed-varying signal causes a drive system to increase the speed of the object to be marked.

9. A process according to claim 8, wherein when the sensor obtains a position for the object to be marked such that the next point which has to be marked on the object lies within a second sub-area of the working area adjacent to the first sub-area, the drive system maintains the speed of the object to be marked.

10. A process according to claim 1, wherein when the sensor obtains a position of the object to be marked such that the next point which has to be marked on the part lies in a third sub-area of the working area a speed-varying signal causes a drive system to reduce the speed of the object to be marked.

11. A process according to claim 1, wherein when the sensor obtains a position for the object to be marked such that the next point which has to be marked on the object is located within a last working sub-area which comprises the area of the working area furthest from the area of the object to be marked in relation to the movement of the object to be marked, a speed-varying signal causes a drive system to adopt a minimum control speed.

12. A process according to claim 1, wherein a first sub-area, a second sub-area, a third sub-area and a final sub-area cover the entire working area.

13. A system for marking a moving object by laser which comprises:
   a laser system with a laser beam configured to mark an object within a working area, and a controller,
   a drive system configured to move the object to be marked, and
   a sensor system to obtain the position of the object to be marked
   wherein,
   the laser system and the sensor system are connected in such a way that the controller for the laser system has a signal input corresponding to a position signal from the sensor system, and
   the laser system and the drive system are connected in such a way that a speed controller for the drive system receives a speed-varying signal from the controller for the laser system which is a function of the position signal received by the laser system in relation to the working area and/or the position of the laser beam within the working area.

14. A system according to claim 13, wherein the speed controller of the drive system is a servocontroller.

15. A system according to claim 14, wherein the signal received by the servocontroller is the servocontroller control signal.

16. A system according to claim 13, wherein the drive system is a rotary system.

17. A system according to claim 16, wherein the rotary system is a rotary system which causes the object to be marked to rotate about itself.

18. A system according to claim 13, wherein the drive system is a system moving the object to be marked in a linear way.

19. A system according to claim 13, wherein the laser system is a two-dimensional marking system configured to move the laser beam within the working area.

20. A system according to claim 13, wherein the laser system is a three-dimensional marking system configured to move the laser beam within the working area.

21. A system according to claim 13, wherein if the sensor obtains a position of the object to be marked such that the next point to be marked on the object is located outside the working area of the laser system, the speed-varying signal causes the drive system to increase the speed of the object to be marked.

22. A system according to claim 13, wherein if the sensor obtains a position for the object to be marked such that the next point to be marked on the part is located in a first sub-area of the working area which comprises the closest area of the working area to the area of the object to be marked in relation to movement of the object to be marked, the speed-varying signal causes the drive system to increase the speed of the object to be marked.

23. A system according to claim 22, wherein when the sensor obtains a position of the object to be marked such that the next point to be marked on the object is located in the second sub-area of the working area adjacent to the first sub-area the drive system maintains the speed of the object to be marked.

24. A system according to claim 22, wherein the first sub-area, the second sub-area, the third sub-area and the final sub-area cover the entire working area.

25. A system according to claim 13, wherein when the sensor obtains a position for the object to be marked such that the next point to be marked on the object is located in the third sub-area of the working area, the varying signal causes the drive system to reduce the speed of the object to be marked.

26. A system according to claim 13, wherein when the sensor obtains a position of the object to be marked such that the next point to be marked on the object is located in a final working sub-area which comprises the area of the working area furthest from the area of the object to be marked in relation to the movement of the object to be marked, the speed-varying signal causes the drive system to adopt the minimum control speed.

* * * * *